United States Patent
Cleghorn et al.

(10) Patent No.: US 7,373,335 B2
(45) Date of Patent: May 13, 2008

(54) SYSTEM AND METHOD FOR PROCESSING DATABASE QUERIES

(75) Inventors: Monica Rose Cleghorn, Plano, TX (US); Kevin V. Nguyen, Allen, TX (US)

(73) Assignee: Accudata Technologies, Inc., Allen, TX (US)

( * ) Notice: Subject to any disclaimer, the term of this patent is extended or adjusted under 35 U.S.C. 154(b) by 588 days.

(21) Appl. No.: 09/964,954

(22) Filed: Sep. 27, 2001

(65) Prior Publication Data

US 2003/0061205 A1  Mar. 27, 2003

(51) Int. Cl.
*G06F 17/30* (2006.01)

(52) U.S. Cl. .............................. 707/3; 707/1

(58) Field of Classification Search .................... 707/1, 707/2, 3, 4, 5, 6, 7, 8, 9, 10, 100, 101, 102, 707/104.1; 379/230, 229; 370/466
See application file for complete search history.

(56) References Cited

U.S. PATENT DOCUMENTS

| | | | |
|---|---|---|---|
| 5,634,053 A * | 5/1997 | Noble et al. ................... 707/4 |
| 5,848,415 A * | 12/1998 | Guck ........................... 707/10 |
| 5,966,431 A * | 10/1999 | Reiman et al. ......... 379/115.01 |
| 6,081,591 A | 6/2000 | Skoog ......................... 379/230 |
| 6,084,956 A | 7/2000 | Turner et al. ............... 379/230 |
| 6,111,893 A | 8/2000 | Volftsun et al. ............. 370/466 |
| 6,151,390 A | 11/2000 | Volftsun et al. ............. 379/229 |
| 6,226,649 B1 * | 5/2001 | Bodamer et al. ......... 707/104.1 |
| 6,778,987 B1 * | 8/2004 | Wynblatt et al. ............. 707/10 |

* cited by examiner

*Primary Examiner*—Yicun Wu
(74) *Attorney, Agent, or Firm*—RG & Associates

(57) ABSTRACT

The present invention provides a system and method for processing a database query between one or more clients and one or more databases. The database query, which is formatted using a first protocol, is received from one of the clients. One of the databases is selected to process the database query and the database query is translated from the first protocol to a second protocol. The translated database query is then sent to the selected database for processing. A response to the database query, which is formatted using the second protocol, is received from the selected database and the response is translated from the second protocol to the first protocol. The present invention determines which of the clients sent the database query and sends the translated response to the client that sent the database query. This method can be implemented as a computer program embodied on a computer readable medium.

51 Claims, 4 Drawing Sheets

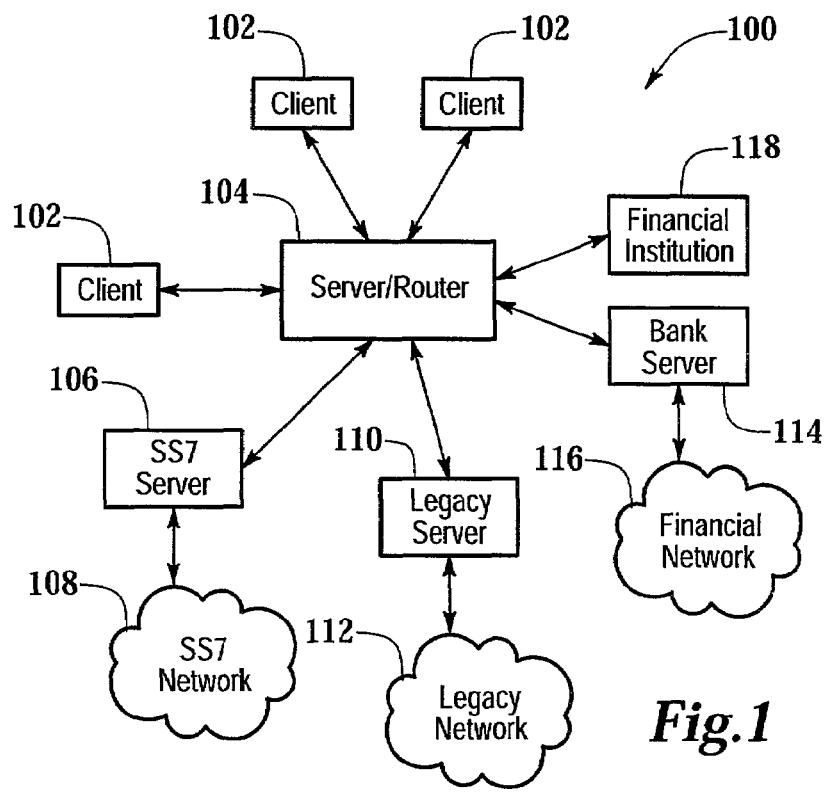
Fig.1
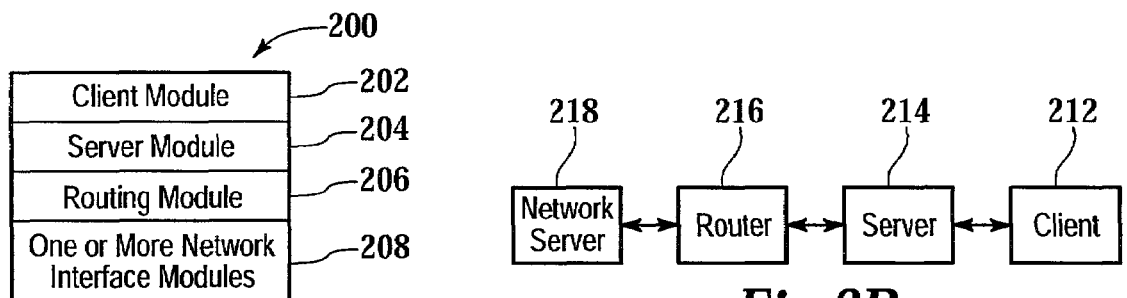
Fig.2A
Fig.2B
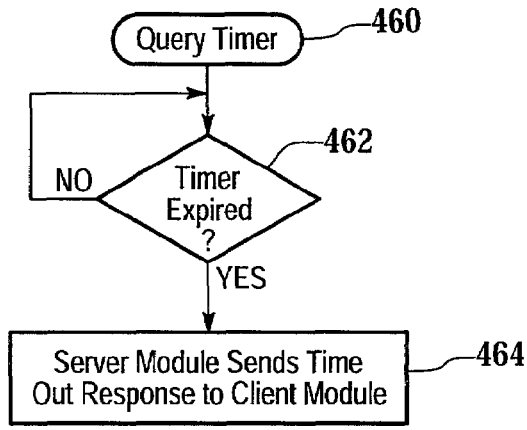
Fig.4C

SYSTEM AND METHOD FOR PROCESSING DATABASE QUERIES

TECHNICAL FIELD OF THE INVENTION

The present invention relates generally to the field of communications and, more particularly, to a system and method for processing database queries.

BACKGROUND OF THE INVENTION

Despite the fact that the government requires existing telecommunication service companies to allow competitors to access their facilities and databases to the extent necessary to provide competitive services, obtaining quick and reliable access to the information contained in these databases has been difficult, if not impossible. For example, competitive local exchange carriers ("CLEC") have not had an easy-to-use, near real-time or real-time system that can access an incumbent local exchange carrier's ("ILEC") database to determine whether a phone number will accept a collect call.

Similarly, the increased use of the Internet for purchasing goods and services has increased the pressure to validate and check pending transaction before they are completed. For example, an Internet retailer would like to determine whether a potential customer's credit card or banking card is valid and whether the account has the credit or funds to pay for the proposed transaction.

In each of the cases described above, a database query will most likely have to cross network boundaries, some of which may use proprietary or legacy protocols. As a result, the processing of these queries is difficult, slow and cumbersome. Accordingly, there is a need for a system and method for processing database queries across network boundaries.

SUMMARY OF THE INVENTION

The present invention provides a system and method for processing database queries across network boundaries. The present invention can be easily installed on one or more personal computers. Moreover, the present invention can create, accept and track database queries in the more commonly used protocols, such as the Internet Protocol and translates them into proprietary or legacy protocols in real or near-real time. As a result, the present invention allows the user to better manage his or her risk with respect to call or transaction processing.

The present invention provides a method of processing a database query between one or more clients and one or more databases. The database query, which is formatted using a first protocol, is received from one of the clients. One of the databases is selected to process the database query and the database query is translated from the first protocol to a second protocol. The translated database query is then sent to the selected database for processing. Thereafter, a response to the database query, which is formatted using the second protocol, is received from the selected database and the response is translated from the second protocol to the first protocol. The present invention then determines which of the clients sent the database query and sends the translated response to the client that sent the database query. This method can be implemented as a computer program embodied on a computer readable medium.

In addition, the present invention provides a system for processing a database query between one or more clients and one or more databases. The system includes a computer communicably coupled to the one or more clients, one or more network servers communicably coupled to the computer and the one or more databases, a server/router module resident on the computer and a network interface module resident on each of the network servers. The server/router module receives the database query, which is formatted using a first protocol, from one of the clients, selects one of the network servers and one of the databases to process the database query, sends the database query to the selected network server, determines which of the clients sent the database query, and sends a translated response to the client that sent the database query. The network interface module translates the database query from the first protocol to a second protocol, sends the translated database query to the selected database for processing, receives a response, which is formatted using the second protocol, to the database query from the selected database, translates the response from the second protocol to the first protocol, and sends the translated response to the computer.

The computer and the server/router module of system described above can be implemented using a first computer communicably coupled to the one or more clients, a second computer communicably to the one or more network servers, a server module resident on the first computer, and a router module resident on the second computer. The server module receives the database query, which is formatted using a first protocol, from one of the clients, sends the database query to the second computer, and sends a translated response to the client that sent the database query. The router module selects one of the network servers and one of the databases to process the database query, sends the database query to the selected network server, determines which of the clients sent the database query, and sends the translated response to the first computer.

Those skilled in the art will appreciate that the present invention is applicable not only to the compression/decompression of packet headers in the ingress to egress direction, but also to the compression/decompression of packet headers in the egress to ingress direction. Other features and advantages of the present invention shall be apparent to those of ordinary skill in the art upon reference to the following detailed description taken in conjunction with the accompanying drawings.

BRIEF DESCRIPTION OF THE DRAWINGS

For a better understanding of the invention, and to show by way of example how the same may be carried into effect, reference is now made to the detailed description of the invention along with the accompanying figures in which corresponding numerals in the different figures refer to corresponding parts and in which:

FIG. 1 is a block diagram of a network in accordance with one embodiment of the present invention;

FIGS. 2A and 2B are block diagrams of various implementations of the present invention;

FIGS. 4A, 4B and 4C are schematic diagrams of a more detailed generic translation method in accordance with one embodiment of the present invention.

DETAILED DESCRIPTION OF THE INVENTION

Figure 3:
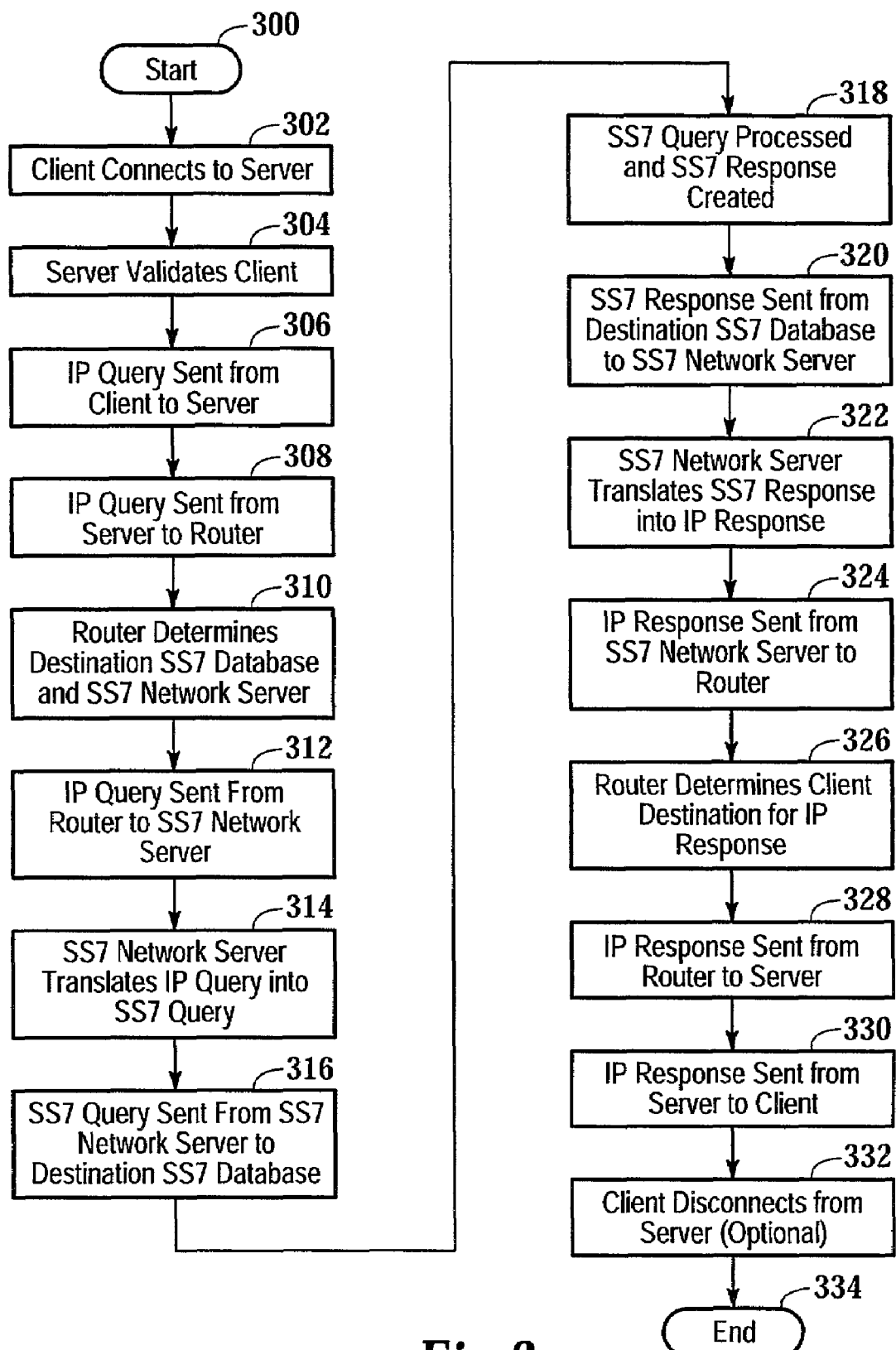
FIG. 3 is a flowchart of an IP to SS7 translation method in accordance with one embodiment of the present invention.

While the making and using of various embodiments of the present invention are discussed in detail below, it should be appreciated that the present invention provides many applicable inventive concepts, which can be embodied in a wide variety of specific contexts. For example, in addition to telecommunications systems and the Internet, the present invention may be applicable to other forms of communications or general data processing. Other forms of communications may include communications between networks, communications via satellite, or any form of communications not yet known to man as of the date of the present invention. The specific embodiments discussed herein are merely illustrative of specific ways to make and use the invention and do not limit the scope of the invention.

The present invention provides a system and method for processing database queries across network boundaries. The present invention can be easily installed on one or more personal computers. Moreover, the present invention can create, accept and track database queries in the more commonly used protocols, such as the Internet Protocol ("IP"), and translate them into proprietary or legacy protocols in real or near-real time. As a result, the present invention allows the user to better manage his or her risk with respect to call or transaction processing.

Referring to FIG. 1, a block diagram of a network 100 in accordance with one embodiment of the present invention is shown. The network 100 includes one or more clients 102 communicably coupled to a server/router 104. The server/router 104 is communicably coupled to a Signaling System 7 ("SS7") network 108 via SS7 server 106, one or more legacy networks 112 via legacy servers 110, and one or more financial networks 116 via bank server 114. One or more financial institutions 118 may also be communicably coupled to the server/router 104. The clients 102 are computers or other devices that submit database queries for processing via the server/router 104. The functions of the server/router 104 can be split on separate computers or processing devices. The servers 106, 110 and 114 function as gateways between the network where the server/router 104 is resident and the networks 108, 112 and 116 where the databases are resident.

One or more databases, data storage devices, computers or information sources responsive to database queries submitted by the clients 102 and financial institution 118 are resident within networks 108, 112 and 116. The database queries can be of any type known to those skilled in the art. For example, the database queries may be part of a call validation process, a call billing process, a bank card validation process, or a bank card settlement process. The devices 102, 104, 106, 110, 114 and 118 can be communicably coupled via a local network, a wide area network, such as the Internet, satellite links, dedicated communication links, dial-up modems, or any other method of establishing a communication link between two devices. Communications between the various devices 102, 104, 106, 110, 114 and 118 can be sent in the clear or encrypted.

Now referring to FIGS. 2A and 2B, block diagrams of various implementations of the present invention are shown. FIG. 2A shows an implementation of the present invention wherein the functionality of the client 102 (FIG. 1), server/router 104 (FIG. 1) and server 106, 110 or 114 (FIG. 1) are combined on a single device 200. The device 200, which may be a computer, includes a client module 202, a server module 204, a routing module 206 and one or more network interface modules 208.

The client module 202 is a user application interface that allows the user to easily and seamlessly create a database query without having special knowledge of the system, network or database that will process the database query. The client module 202 can be run in a demand mode where the user decides when to send a database query or in an automatic mode where a database query is automatically created and sent in response to one or more events. The client module 202 will also present the results of the database query in an easy to understand format.

The server module 204 is capable of dealing with many instances of the client module 202 wherever they reside. The server module 204 validates the client module 202 before any database queries are forwarded to the routing module 206. In addition, the server module 204 is responsible for receiving database queries from the client module 202 and sending responses to those queries to the appropriate client module 202.

The routing module 206 selects the network interface 208 and the database to send the database query to and then sends the database query to the selected network interface 208. When the routing module 206 receives a response to a database query, it determines which of the client modules 202 sent the database query and then sends the response to that client module 202.

The network interface module 208 translates the database query from a first protocol to a second protocol. The first protocol is used by the network where the database query originated and the second protocol is used by the network where the database resides. For example, the first protocol could be an IP or Internet capable protocol. Likewise, the second protocol could be a signaling protocol, such as SS7, or a proprietary protocol used by the database owner. The network interface module 208 then sends the translated database query to the selected database for processing. Thereafter, the network interface module 208 receives a response from the selected database and translates it from the second protocol to the first protocol. The translated response is then sent to the routing module 206.

FIG. 2B shows an implementation of the present invention wherein the functionality of the client 102 (FIG. 1), server/router 104 (FIG. 1) and server 106, 110 or 114 (FIG. 1) are separated and placed on multiple devices 212, 214, 216 and 218. The client 212, which may be a computer, includes the client module. The server 214, which may be a computer, includes the server module. The router 216, which may be a computer, includes the routing module. The network server 218, which may be a computer, includes one or more of the network interface modules. The contrast between FIGS. 2A and 2B demonstrates the versatility of the present invention.

Referring now to FIGS. 2B and 3, a flowchart of an IP to SS7 translation method in accordance with one embodiment of the present invention is shown in FIG. 3. The process starts in block 300. The client 212 connects to the server 214 in block 302 and the server 214 validates the client 212 in block 304. If the client 212 is successfully validated, an IP Query (a database query in an IP format—the first protocol) is sent from the client 212 to the server 214 in block 306. The IP Query is then sent from the server 214 to the router 216 in block 308 where the router 216 determines the destination SS7 database and the SS7 network server 218 to which the IP Query should be sent in block 310. The IP Query is sent from the router 216 to the SS7 network server 218 in block 312 where the SS7 network server 218 translates the IP Query into a SS7 Query (a database query in a SS7 format—the second protocol) in block 314. The SS7 Query is sent to the destination SS7 database for processing in block 316.

The destination SS7 database processes the SS7 Query and creates a SS7 Response in block 318. Those skilled in the art will recognize that the actual processing of the SS7 Query may be accomplished with a database interface application or other type of management software to control and handle queries to the database. The SS7 Response is then sent from the SS7 destination database to the SS7 network server 218 in block 320 where the SS7 network server 218 translates the SS7 Response (a database response in a SS7 format—the second protocol) into an IP Response (a database response in an IP format—the first protocol) in block 322. The IP Response is sent from the SS7 network server 218 to the router 216 in block 324 where the router 216 determines the client destination for the IP Response in block 326. The IP Response is then sent from the router 216 to the server 214 in block 328 and then from the server 214 to the client 212 in block 330. The client 212 can then either disconnect from the server 214 in block 332 or repeat the process previously described for new database queries. Once disconnected, the process ends in block 334. Those skilled in the art will recognize that the process described in FIG. 3 is not limited to the use of the IP and SS7 protocols.

Figure 4A:
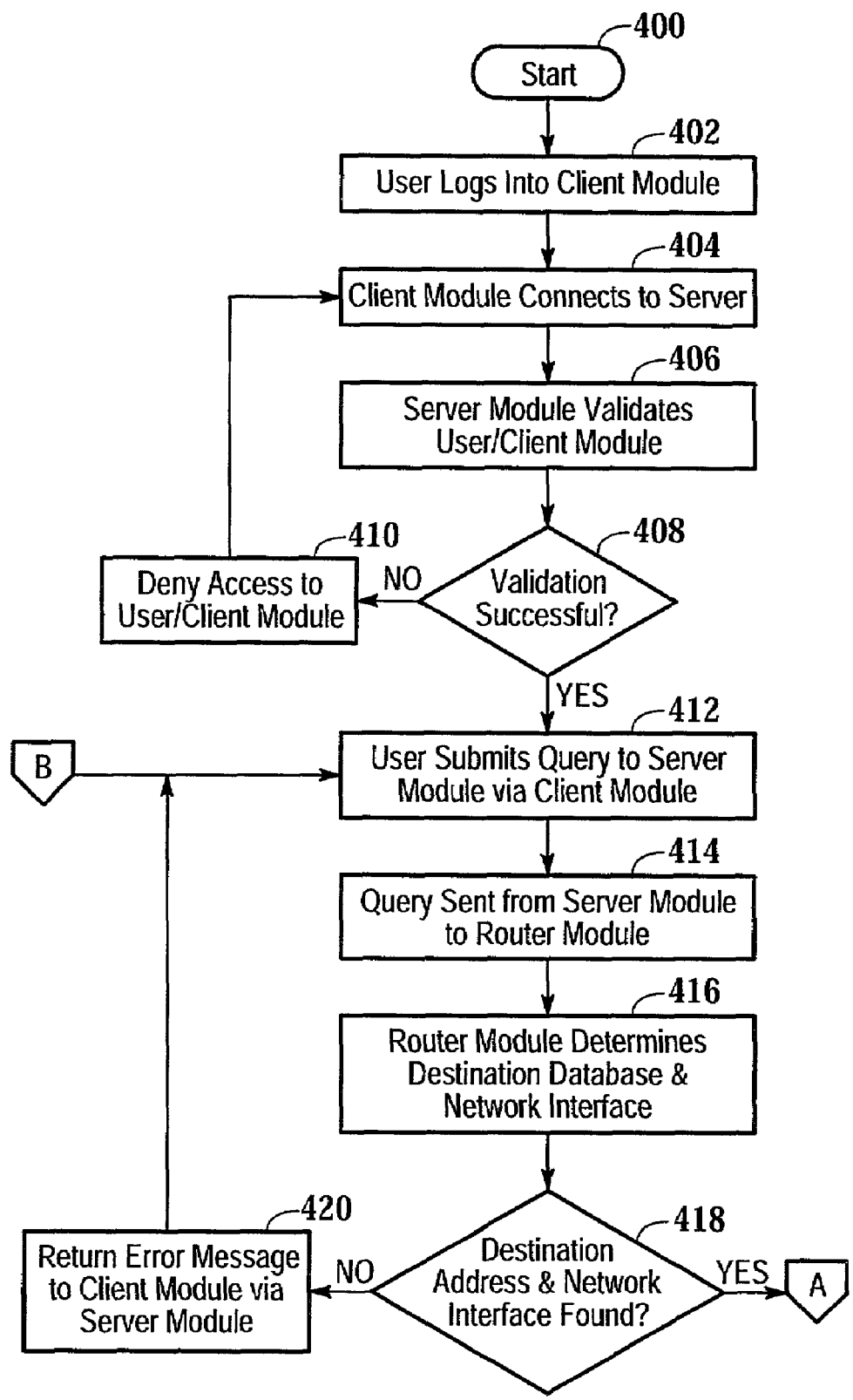
Figure 4B:
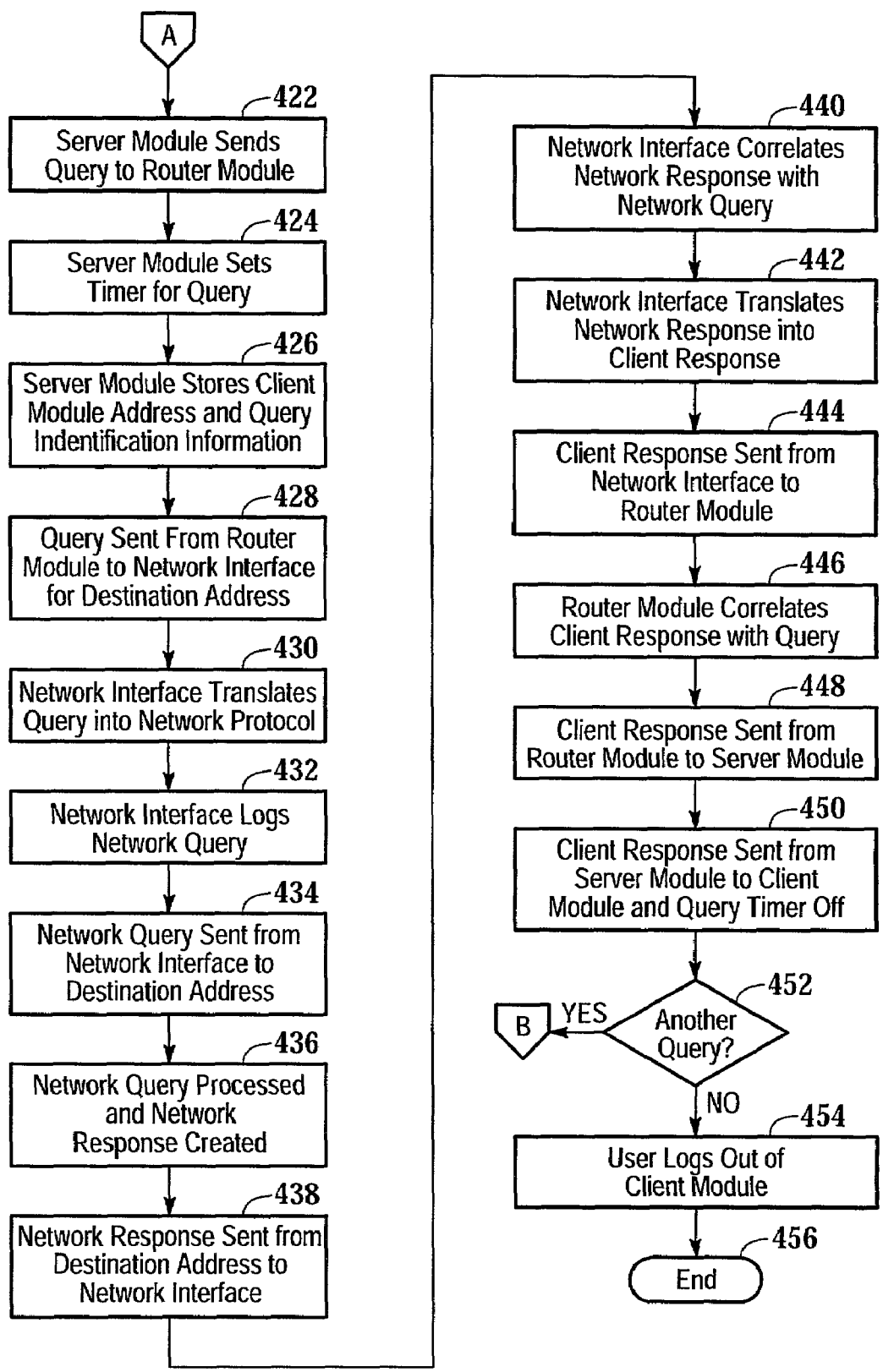

Now referring to FIGS. 4A, 4B and 4C, schematic diagrams of a more detailed generic translation method in accordance with one embodiment of the present invention are shown. The process starts in block 400. The user logs into the client module in block 402 and the client module connects to the server module in block 404. The server module validates the user and/or client module in block 406. If the validation is not successful, as determined in decision block 408, the server module denies access to the user and/or client module in block 410 and the process loops back to allow the user and/or client module to try again in block 402 or 404.

If, however, the validation is successful, as determined in decision block 408, the user submits a query, which is formatted in a first protocol, to the server module via the client module in block 412. The query is then sent from the server module to the router module in block 414 where the router module determines the destination database and network interface module in block 416. If the destination address (database) and network interface module are not found, as determined in decision block 418, an error message is returned to the client module via the server module in block 420 and the process loops back to allow the user to submit another query in block 412.

If, however, the destination address (database) and network interface module are found, as determined in decision block 418, the server module sends the query to the router module in block 422 and the server module sets a timer for the query in block 424. The server module also stores the client module address and query identification information in block 426 so that the response to the query can be sent to the correct client module. The query is then sent from the router module to the network interface module for the destination address (destination network server and database) in block 428. The network interface module translates the query into a network query (a database query formatted in the second protocol) in block 430. The network interface module then logs the network query in block 432 and sends the network query to the destination address (database) for processing in block 434.

The destination database processes the network query and creates a network response in block 436. Those skilled in the art will recognize that the actual processing of the network query may be accomplished with a database interface application or other type of management software to control and handle queries to the database. The network response is then sent from the destination address (database) to the network interface module in block 438 where the network interface module correlates the network response with the corresponding network query in block 440. The network interface module translates the network response (a database response in the second protocol format) into a client response (a database response in the first protocol format) in block 442. The client response is sent from the network interface module to the router module in block 444 where the router module correlates the client response with the query (determines the proper client module) in block 446. The client response is then sent from the router module to the server module in block 448 and then from the server module to the client module in block 450. The query timer is also turned off in block 450. If there are not other queries, as determined by decision block 452, the user logs out of the client module in block 454 and the process ends in block 456. If, however, there is another query, as determined in decision block 452, the process loops back to receive another query from the user in block 412.

After the query has been sent by the server module in block 422, the query timer monitors whether a response to the query has been received. If the timer has not expired, as determined in decision block 462, the query timer continues to wait for a response. If, however, the timer has expired, as determined in decision block 462, the server module sends a time out response to the client module in block 464. As previously described, the client module, server module, router module and network interface module can be separated or combined in any configuration that fits the application of the present invention.

If encrypted messages are required, the steps of sending the translated database query to the selected database for processing and receiving a response to the database query from the selected database will be performed using the following steps. The translated database query is first encrypted. Thereafter, the encrypted database query is sent to the selected database for processing. With respect to the responses, the encrypted response to the encrypted database query is received from the selected database. Thereafter, the encrypted response is decrypted into a response. Any type of standard encryption/decryption method can be used.

For example, the present invention can be used find out information about a specific telephone number. In such a case, the user uses the client module to create and submit a query using the telephone number to the server module. The router then selects the proper database, which is usually a line information database ("LIDB") located on an ILEC's signaling network, to process the query. The response from the database can then be used to process a call related to the telephone number. Similarly, the user can submit a calling card number, credit card number or bank card number.

The embodiments and examples set forth herein are presented to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A method of processing a database query between one or more clients and one or more databases, the method comprising the steps of: receiving the database query from one of the clients, the database query related to information about a telephone number, the database query sent using the telephone number, the database query formatted using a first protocol; storing a module address and query identification information of the one of the clients; setting a query timer; selecting one of the databases to process the database query; translating the database query from the first protocol to a second protocol; sending the translated database query to the selected database for processing; processing the translated database query by a line information database; receiving a response to the database query from the selected database, the response used to process a call related to the telephone number; the response formatted using the second protocol; translating the response from the second protocol to the first protocol; determining which of the clients sent the database query based on the stored module address and the query identification information; and sending the translated response to the client that sent the database query based on the setting of the query timer.

2. The method as recited in claim 1, further comprising the step of validating the client.

3. The method as recited in claim 1, further comprising the step of sending a time out response to the client that sent the database query whenever the translated response has not been received within a specified time period.

4. The method as recited in claim 1, further comprising the step of logging the database query.

5. The method as recited in claim 1, further comprising the step of storing an address identifier for the client that sent the database query.

6. The method as recited in claim 1, further comprising the step of storing a query identifier for the database query.

7. The method as recited in claim 1, wherein the steps of sending the translated database query to the selected database for processing and receiving a response to the database query from the selected database, the response formatted using the second protocol comprise the steps of: encrypting the translated database query; sending the encrypted database query to the selected database for processing; receiving an encrypted response to the encrypted database query from the selected database, the response formatted using the second protocol; and decrypting the encrypted response into a response.

8. The method as recited in claim 1, wherein the first protocol is an Internet protocol.

9. The method as recited in claim 1, wherein the second protocol is a signaling protocol.

10. The method as recited in claim 9, wherein the signaling protocol is a Signaling System 7 protocol.

11. The method as recited in claim 1, wherein the database query is part of a call validation process.

12. The method as recited in claim 1, wherein the database query is part of a call billing process.

13. The method as recited in claim 1, wherein the database query is part of a bank card validation process.

14. The method as recited in claim 1, wherein the database query is part of a bank card settlement process.

15. The method as recited in claim 1, wherein the selected database is a line information database.

16. A computer program embodied on a computer readable medium for processing a database query between one or more clients and one or more databases, the computer program comprising: a code segment for receiving the database quay from one of the clients, the database query related to information about a telephone number, the database query sent using the telephone number, the database query formatted using a first protocol; a code segment for storing a module address and query identification information of the one of the clients; a code segment for setting a query timer; a code segment for selecting one of the databases to process the database query; a code segment for translating the database query from the first protocol to a second protocol; a code segment for sending the translated database query to the selected database for processing; a code segment for processing the translated database query by a line information database; a code segment for receiving a response to the database query from the selected database, the response used to process a call related to the telephone number; the response formatted using the second protocol; a code segment for translating the response from the second protocol to the first protocol; a code segment for determining which of the clients sent the database query based on the stored module address and the query identification information; and a code segment for sending the translated response to the client that sent the database query based on the setting of the query timer.

17. The computer program as recited in claim 16, further comprising a code segment for validating the client.

18. The computer program as recited in claim 16, further comprising a code segment for sending a time out response to the client that sent the database query whenever the translated response has not been received within a specified time period.

19. The computer program as recited in claim 16, further comprising a code segment for logging the database query.

20. The computer program as recited in claim 16, further comprising a code segment for storing an address identifier for the client that sent the database query.

21. The computer program as recited in claim 16, further comprising a code segment for storing a query identifier for the database query.

22. The computer program as recited in claim 16, wherein the a code segments for sending the translated database query to the selected database for processing and receiving a response to the database query from the selected database, the response formatted using the second protocol comprise: a code segment for encrypting the translated database query; a code segment for sending the encrypted database query to the selected database for processing; a code segment for receiving an encrypted response to the encrypted database query from the selected database, the response formatted using the second protocol; and a code segment for decrypting the encrypted response into a response.

23. The computer program as recited in claim 16, wherein the first protocol is an Internet protocol.

24. The computer program as recited in claim 16, wherein the second protocol is a signaling protocol.

25. The computer program as recited in claim 24, wherein the signaling protocol is a Signaling System 7 protocol.

26. The computer program as recited in claim 16, wherein the database query is part of a call validation process.

27. The computer program as recited in claim 16, wherein the database query is part of a call billing process.

28. The computer program as recited in claim 16, wherein the database query is part of a bank card validation process.

29. The computer program as recited in claim 16, wherein the database query is part of a bank card settlement process.

30. The computer program as recited in claim 16, wherein the selected database is a line information database.

31. A system for processing a database query between one or more clients and one or more databases, the system comprising: a computer communicably coupled to the one or more clients; one or more network servers communicably coupled to the computer and the one or more databases; a server/router module resident on the computer, the server/router module receiving the database query from one of the clients, the database query related to information about a telephone number, the database query sent using the telephone number, the database query formatted using a first protocol, the server/router module storing a module address and query identification information of the one of the clients and setting a query timer selecting one of the network servers and one of the databases to process the database query, sending the database query to the selected network server, determining which of the clients sent the database query, and sending a translated response to the client that sent the database query; and a network interface module resident on each of the network servers, the network interface module translating the database query from the first protocol to a second protocol, sending the translated database query to the selected database for processing, processing the translated database query by a line information database; receiving a response to the database query from the selected database, the response used to process a call related to the telephone number; the response formatted using the second protocol, translating the response from the second protocol to the first protocol, and sending the translated response to the computer based on the setting of the query timer.

32. The system as recited in claim 31, wherein the server/router module validates the client.

33. The system as recited in claim 31, wherein the server/router module sends a time out response to the client that sent the database query whenever the translated response has not been received within a specified time period.

34. The system as recited in claim 31, wherein the network interface module logs the database query.

35. The system as recited in claim 31, wherein the server/router module stores an address identifier for the client that sent the database query.

36. The system as recited in claim 31, wherein the server/router module stores a query identifier for the database query.

37. The system as recited in claim 31, wherein the network interface module sends the translated database query to the selected database for processing and receives the response to the database query from the selected database, the response formatted using the second protocol by encrypting the translated database query, sending the encrypted database query to the selected database for processing, receiving an encrypted response to the encrypted database query from the selected database, the response formatted using the second protocol, and decrypting the encrypted response into the response.

38. The system as recited in claim 31, wherein the computer and the server/router module comprise: a first computer communicably coupled to the one or more clients; a second computer communicably to the one or more network servers; a server module resident on the first computer, the server module receiving the database query from one of the clients, the database query formatted using a first protocol, sending the database query to the second computer, and sending a translated response to the client that sent the database query; and a router module resident on the second computer, the router module selecting one of the network servers and one of the databases to process the database query, sending the database query to the selected network server, determining which of the clients sent the database query, and sending the translated response to the first computer.

39. The system as recited in claim 31, wherein the first protocol is an Internet protocol.

40. The system as recited in claim 31, wherein the second protocol is a signaling protocol.

41. The system as recited in claim 40, wherein the signaling protocol is a Signaling System 7 protocol.

42. The system as recited in claim 31, wherein at least one of the network servers is a service control point.

43. The system as recited in claim 31, wherein at least one of the network servers is a legacy server.

44. The system as recited in claim 31, wherein at least one of the network servers is a bank server.

45. The system as recited in claim 31, wherein the database query is part of a call validation process.

46. The system as recited in claim 31, wherein the database query is part of a call billing process.

47. The system as recited in claim 31, wherein the database query is part of a bank card validation process.

48. The system as recited in claim 31, wherein the database query is part of a bank card settlement process.

49. The system as recited in claim 31, wherein the selected database is a line information database.

50. A method of processing a database query between at least one client and at least one database, the method comprising: receiving the database query from the client, the database query related to information about a telephone number, the database query sent using the telephone number, the database query formatted using a first protocol; storing a module address and query identification information of the one of the clients; setting a query timer; selecting the database to process the database query; translating the database query from the first protocol to a second protocol; sending the translated database query to the selected database for processing; processing the translated database query by a line information database; receiving a response to the database query from the selected database, the response used to process a call related to the telephone number; the response formatted using the second protocol; translating the response from the second protocol to the first protocol; and sending the translated response to the client based on the setting of the query timer.

51. The method of claim 50, wherein the database is at least one of:
 a client;
 the client;
 a part of the client; and
 a server.

* * * * *